March 21, 1967
F. A. HINSON ETAL
3,310,379
PROCESS AND APPARATUS FOR THE PRODUCTION OF CARBON BLACK
Filed March 7, 1963
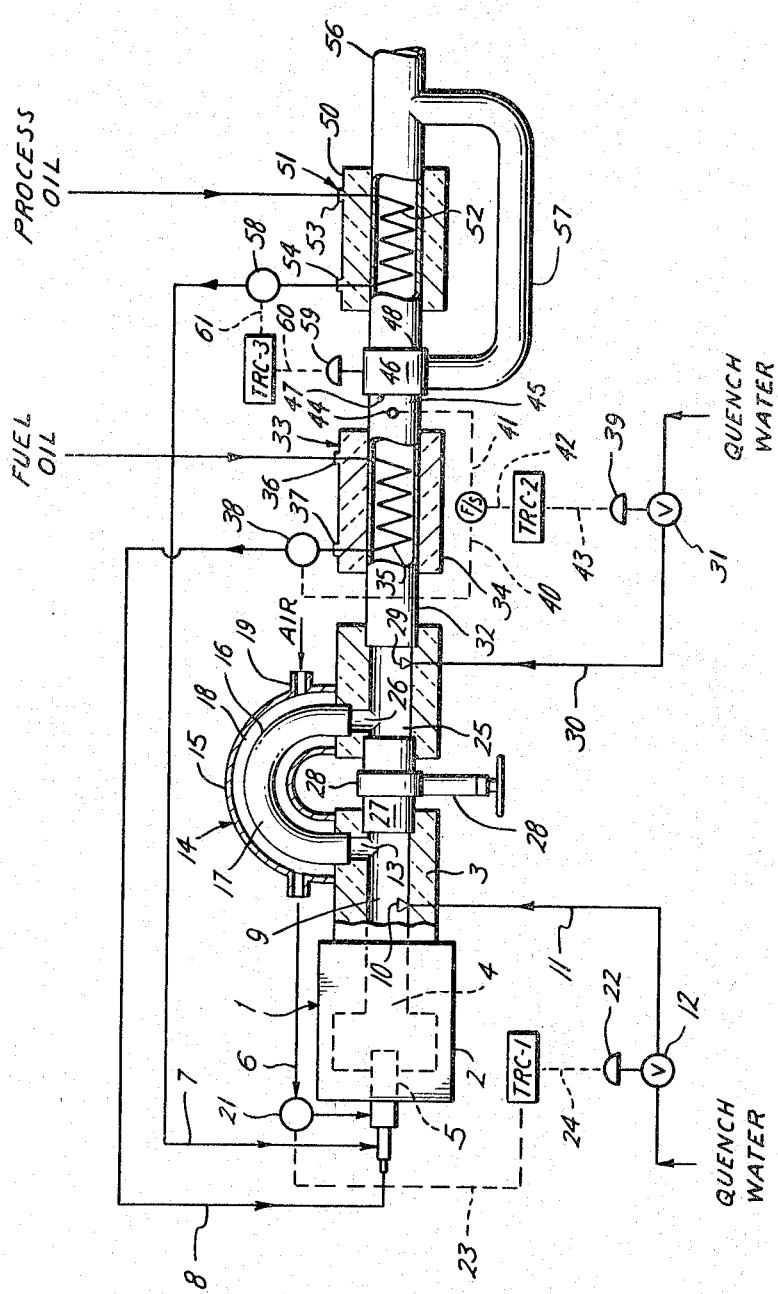
William R. Wright
Fletcher A. Hinson
Kenneth E. Powell
INVENTORS
BY Llewellyn A. Proctor
ATTORNEY

3,310,379
PROCESS AND APPARATUS FOR THE PRODUCTION OF CARBON BLACK

Fletcher A. Hinson, Aransas Pass, William R. Wright, Rockport, and Kenneth E. Powell, Houston, Tex., assignors to Ashland Oil & Refining Company, Houston, Tex., a corporation of Kentucky
Filed Mar. 7, 1963, Ser. No. 263,663
10 Claims. (Cl. 23—209.4)

This invention relates to the art of producing carbon blacks. In particular, it relates to method and apparatus for controlled quenching and for recovery of heat from process streams in the manufacture of carbon blacks.

Conservation of heat from process streams by circulation thereof through coils, jackets, or over external surfaces in contact with cooler fluids or solutions to be warmed is well known to the art, such system being referred to as heat exchanger systems because the warmer fluid circulated on one side of the contact surface liberates heat to the cooler fluid on the opposite side of the surface in accordance with the laws of thermodynamics. Such conservation measures, however, find only limited use in the carbon black manufacturing industry despite the enormous amounts of heat produced in such processes.

Most commercial grades of carbon blacks are presently made in furnaces or reactors wherein normally liquid feed hydrocarbons are contacted with hot surfaces or hot combustion gases of burning fuel and oxygen. The hydrocarbon is burned in a deficiency of oxygen so that the heat generated by combustion of part of the hydrocarbon will decompose the remainder thereof; or the hydrocarbon is decomposed by contact with combustion gases of a different fuel hydrocarbon and oxygen, generally natural gas and air. The reaction dissociates the feed hydrocarbon into carbon black solids particles suspended in an intensely hot effluent gas formed from byproduct gases including hydrogen, carbon monoxide and other inert gases. Such pyrolytic cracking of a hydrocarbon feed to carbon black generally produces gases having temperatures of about 2300° F. and higher.

At some time prior to exit from the furnace the effluent gas must be cooled below the temperature of further pyrolytic reaction. But moreover, the temperature must be further reduced, inter alia, so that it will be cool enough to permit further processing in normal process equipment. The common practice is to quench the stream with water which is sprayed or injected into the effluent just prior to its exit from the furnace. Pursuant to this technique the temperature is generally reduced down to about 500° F. to 1000° F.

A major disadvantage of quenching is that the heat value of the burning fuel is permanently lost. But perhaps even worse, considerable quantities of water vapor are introduced into the effluent gas. In fact, in normal operations the total quantity of off gas from a reactor is increased by as much as about 50 percent of its original volume. Quenching is therefore particularly burdensome. Thus, inter alia, bag filter units are used in processing the effluent gas to remove carbon black and such equipment functions at extreme disadvantage in the presence of large amounts of moisture. The presence of the vapor causes difficult and expensive maintenance problems and necessitates frequent off-periods. Moreover, because of the excessive quantities of water in the off-gas or effluent far greater capacity is required to handle the increased quantity of gases. These and other problems are related generally in proportion directly to the excessive amount of moisture in the effluent. For this reason, ofttimes deliberate substantial cooling of the effluent is effected by loss of heat through the equipment to the atmosphere, though obviously provision of increased exposed surfaces is onerous in that it calls for greater expenditure by way of equipment.

While workers in the art have endeavored to recover heat from the effluent gas their success has been rather modest. Heat conservation by the preheating to a constant temperature of an in-put material to the furnace is especially desirable; and the preheating of all in-put materials would provide an even greater advantage. Thus, it is well known that preheating of these materials to a uniform preselected temperature contributes very favorably to the uniformity and quality of the carbon black products. Unfortunately, present methods do not provide as constant a temperature for an in-put material as is desirable. This is especially true where a plurality of in-put materials have been preheated. The temperature of the input materials tend to fluctuate, resulting in losses in product quality and operating efficiency. Perhaps the major reason for this shortcoming is that the in-put materials cannot all be heated to the same extent. For instance, an oil feedstock cannot be heated to as high a temperature as process air, which supplies oxygen for burning the fuel. The air required for the process can be heated without danger to above 1000° F. but, on the other hand, a feed hydrocarbon, generally an oil feedstock, will carbonize or "coke" if heated to a temperature in excess of about 800° F.—thus clogging burners and delivery lines. In consequence then, it has generally been considered necessary to provide completely separate heating facilities for the different in-put materials to the reactor. For this reason completely different and independent heating facilities have often been provided completely ignoring the untapped and unused heat present in the hot effluent gas from the reactor.

It is accordingly an object of this invention to obviate these and other prior art deficiencies, by providing method and apparatus for preheating a carbon black reactor input material to a relatively constant temperature. In particular, it is an object to provide a method for preheating a plurality of input materials to preselected relatively constant changing temperatures. More particularly, the present invention has for its object the successive preheating of a plurality of input materials to preselected, relatively constant charging temperatures by successive withdrawals of heat from a given mass of reactor effluent; and for the minimizing of instabilities which tend to occur in preheating systems wherein a plurality of input materials are heated in successive heat exchange operations involving a given mass of reactor effluent.

These objects, and others, are achieved in accordance with the present invention by providing a method and apparatus wherein heat can be withdrawn from the effluent gas evolved from a carbon black reactor by contact thereof through a heat exchange surface with an input material, which heat is utilized in preheating a reactor input material to a relatively constant preselected input temperature. The preselected input temperature in turn is used to regulate the quantum of heat supplied by quenching the effluent to the heat exchange surface sufficient to maintain the desired preselected temperature of the input material to the reactor. Convenient means by which the reactor input material can be heated by the effluent through a heat exchange surface to the desired temperature encompasses the use of a primary temperature sensing device operatively associated with motor-relay controlled quenching means and in combination therewith by-passes, if desired, depending upon the desired degree of temperature regulation. For example, a primary temperature sensing device measuring the temperature of an input material receiving heat from the effluent is set at a preselected desired temperature, which device automatically adjusts downwardly the temperature of the effluent to the heat exchange surface by quenching the effluent with a fluid prior to its contact with the heat exchange surface; or adjusts the quantum of heat supplied to the heat exchange surface by the effluent by the combination of quenching and regulating the total mass of effluent passing in contact with the heat exchange surface.

Pursuant to a preferred embodiment heat is extracted from the effluent by a plurality of input materials to the reactor. This embodiment calls for the staging of an integrated series of heat exchange surfaces, one for each input material to the reactor. The plurality of input materials are each heated to relatively constant preselected input temperatures, though generally to different temperatures, by contact of an input material with a heat exchange surface. The temperature of the respective input material is then utilized not only for regulating and controlling the heat supplied to its own heat exchange surface but also regulates and controls the quantum of heat supplied to the next succeeding heat exchange surface of the series. Thus, the quantum of heat supplied to a succeeding heat exchange surface, and consequently to a second input material, results from the combination of steps which include extracting an increment of heat from the reactor effluent by contact through a heat exchange surface with an input material then quenching the effluent with a fluid to reduce its temperature prior to its passage to the next heat exchange surface of the series.

An advantageous procedure for preheating to a constant temperature a plurality of input materials to a reactor is to first preheat the process air (oxygen) to the desired temperature at the first of a series of heat exchange surfaces or preheat stations. This is because the coefficient of heat transfer through a heat exchange surface for air is relatively low as contrasted with other normal reactor input materials, and therefore advantage can be gained by utilizing the high temperature of the effluent gas as initially discharged from the reactor. Generally, immediately downstream of the air preheat station and adjacent thereto is then placed a fuel oil or gas preheat station because a lower preheat temperature is generally desired. And also, the coefficient of heat transfer is higher for oil than for air. Consequently, pursuant to this alignment a maximum of heat is extracted by the air and a minimum of quenching is used at the first preheat station. The same is true at the second preheat station, a maximum of heat is extracted by the fuel oil or gas and a minimum of quenching is used, if desired. Following the fuel preheat station is next provided, for generally similar reasons, a feed hydrocarbon or process oil preheat station. Pursuant to these embodiments then the maximum desirable quantum of heat is withdrawn from the effluent and the amount of quenching curtailed.

In most practical embodiments the quantum of air, fuel and feed hydrocarbon to be preheated for use in the reactor is insufficient to reduce the temperature of the effluent gas without some additional means of cooling. Therefore, in normal practice some quenching of the effluent is generally desirable. This is preferably done in stages and the actual injection of the fluid is preferably done slightly upstream of each of the respective heat exchange surfaces so that better temperature control and regulation is provided not only for and by the respective preheated input material to the reactor but also for providing the effluent at the desired temperature at the succeeding heat exchange surface.

This invention will be better understood by reference to the accompanying schematic drawing of a typical carbon black reactor provided with a sequence of preheat stations for heating a plurality of input materials to the reactor; and to the following detailed description of the invention which makes reference to this drawing.

Referring to the drawing is shown a reactor 1 within which lies a combustion chamber 4. Such combustion chamber 4 is enclosed within an outer steel shell 2 lined with a refractory material 3. Entering into the reactor 1 is a burner 5 through which can be introduced the process air, process oil (feed hydrocarbon) and the fuel oil (or gas) as via lines 6, 7, 8, respectively. While here it is shown that the combustion mixture and process oil enter the reactor 1 through the burner 5 the method of introduction of any of the in-put materials is not pertinent to the present invention. All that is essential in the present invention is that the materials be brought together within the reactor to produce hot effluent gas containing carbon black particles. Hence the fuel oil, process air, and process oil can be introduced as separate streams or as a mixed stream, or streams, and can be introduced axially or tangentially. Moreover, while the entry feature of the combustion chamber 4 is shown of larger cross-sectional diameter than its exit feature, the combustion chamber 4 can be of any configuration. The shape or relative shape thereof is immaterial for the practice of this invention.

Located downstream of the combustion chamber 4 is shown a series of preheat stations 14, 33, 51 for preheating the input materials to the reactor 1 by heat exchange between these materials and the effluent gas from the combustion chamber 4 of the reactor. Thus, at each of these stations 14, 33, 51 the process air, fuel oil and process oil are in heat transfer contact with the effluent gas passing from combustion chamber 4 via heat exchange surfaces. The sequence of heat exchangers 14, 33, 51 is methodically arranged and at preheat stations 14, 33 there is extracted from the effluent a preselected quantum of heat and also the effluent is sequentially quenched to a lower preselected temperature and then passed to the next preheat station. At preheat station 51 the quantum of heat to the process oil is controlled by operation of a bypass which regulates the amount of effluent gas coming into contact wtih the heat exchange surface.

The first station on the upstream side of combustion chamber 4 is preheat station 14. Preheat station 14 comprises a tube and shell type heat exchanger through the tube 17 of which is passed a portion or all of the effluent gas from the combustion chamber 4. The quantity of effluent gas through the tube 17 is regulated by the partial or complete closing of the short length of line 27 by cut-off valve 28. The valve 28 is ordinarily closed so that all of the effluent from the combustion chamber 4 passes through tube 17 via opening 13 and exits via opening 26. Process air, passed into the heat exchanger 14 via line 19 and exiting therefrom through line 6 to the burner 5, is heated as it passes through the opening 18 formed by the outer walls 15 of the heat exchanger 14 and the walls 16 of tube 17. The air is heated to a preselected temperature by contact with the outer walls 16 of tube 17.

The preselected temperature of the process air is provided, controlled and regulated by use of a primary temperature sensing device 21 in line 6 in conjunction with a controller which is set at the desired temperature. The primary sensing device produces signals indicative of deviations from the set temperature. These signals are here used to provide an actuating signal for proportioning a flow of quench water to the effluent to reduce its temperature when the primary temperature sensing device 21 indicates a temperature above this set point. Thus, there is shown a quench chamber 9 having quench spray means including a nozzle 10. The nozzle 10 is connected with a source of quenching fluid, usually water, by means of a fluid supply conduit 11 fitted with a regulating valve 12. The extent of quenching is determined by the opening and closing of the valve 12, in response to motor means 22. Thus, the valve 12 and motor means 22 constitute a portion of a temperature responsive controller TRC-1. TRC-1 is connected via transmission line 23 to the temperature sensing device 21 and via transmission line 24 to motor means 22 which is operatively associated with quench fluid regulating valve 12. TRC-1 is adapted to receive and interpret the signal from sensing means 21 and to send an actuating signal to motor means 22, causing the valve 12 to arrive at a throttled setting resulting in a standard flow of quench fluid into the reactor when the input material passing through line 6 is at the proper temperatures. It is adapted to open to permit flow, or a faster flow, of quench fluid when the temperature of the input material climbs above the desired temperature.

The heat exchanger-quench control means provided by preheat station 14 delivers air to the reactor 1 at a relatively constant temperature, providing stable reactor operation. It can provide a complete system for regulating the temperature of any single reactor input material, though air has been specifically mentioned by way of illustration. In accordance with the more preferred aspects of this invention, however, a plurality of input materials to the reactor are heated to preselected relatively constant temperatures by successive withdrawals of heat from the reactor effluent, this providing even greater reactor stabilization and also reducing the total quantum of moisture added to the effluent gas. Pursuant to this embodiment then a plurality of input materials are heated in successive heat exchange operations. Accordingly, in preferred arrangements the preheat station described, particularly the air preheat station, is only the first of a series of preheat stations and others will now be described by further reference to the drawing.

In accordance with this embodiment of the invention then, additional preheat stations are provided for the preheating of additional input materials, preferably for all input materials to the reactor. Thus, a preheat station 33 is provided for heating of fuel oil to the desired input temperature and preheat station 51 for preheating the process oil to the desired temperature.

Additional heat is thus extracted from the effluent by the fuel oil at preheat station 33. This extraction of heat by the fuel oil is accompanied by an additional quench which provides the desired input temperature for the fuel oil and also reduces the temperature to the extent desirable, of the effluent gas prior to its passage to the next preheat station 51. This secondary quenching is also done by the use of temperature sensing devices 38, 44 which control a supply of quenching fluid for injection into the effluent slightly upstream of the preheat station 33.

Preheat station 33 includes a heat exchanger provided by the enclosing outer shell 34 about the fuel oil coil 35 enclosed therein. The reactor effluent from opening 26 and from line 32 contacts coil 35 and exits through the downstream outlet line 45. By this means the second reactor input material is heated. Thus, the inlet 36 is connected to a source of fuel oil and the oil which passes through coil 35 is heated and exits via the outlet 37 connected to injection line 8 to the reactor.

In combination with the heat exchanger provided by the surfaces of shell 34 and fuel oil coil 35 is provided a second quench chamber 25, for injection of quenching fluid into the effluent gas as it comes into the chamber 25 via outlet 26 or through outlet 26 and also line 27. Quench chamber 25 is provided with quenching means, including a quench spray 29, a quench fluid supply conduit 30 and a regulating valve 31 in the conduit. The quench chamber per se terminates at the outlet line 32 downstream of the quench spray 29.

The function of preheat station 33 is to diminish variations in the temperature of the input material delivered to the reactor through injection line 8 and to control the temperature of the effluent delivered to the next preheat station 51. To accomplish this temperature responsive control means are provided. These control means include temperature sensing means 38 in injection line 8, temperature sensing means 44 in outlet line 45, temperature responsive controller TRC–2 and motor means 39. These control elements are by and large analogous in nature and operation to sensing means 21, TRC–1 and motor means 22, respectively. Thus, the temperature of the input material to the reactor—viz. the fuel oil—can be regulated and controlled by temperature sensing means 38 in combination with TRC–2 and motor means 39.

But, there is also provided an additional temperature sensing device 44 located at the outlet of heat exchanger 33 and within outlet line 45. This sensing device 44 controls when the temperature of the effluent rises above a preset temperature. Control is provided by means of a function switch F/S which connects the temperature sensing means 38, 44 through transmission lines 40, 41 and through transmission lines 42, 43 to the motor relay 39 and regulator valve 31. Pursuant to this feature either temperature sensing device 38 or 44 controls, as desired.

The function switch F/S is an automatic device adapted to continuously receive temperature signals from temperature sensing means 38, 44 and to transmit only the higher of these signals to TRC–2, unless the signals happen to be the same. Normally, the signals will differ from one another and the function switch is set to transmit only the higher of the two signals continuously until it is superseded by or drops below the other signal, whereupon the device switches over to the other signal. So, to the extent that only one temperature signal controls TRC–2 is similar to TRC–1 in purpose and operation.

On receipt of an actuating signal from TRC–2, motor means 39 adjusts valve 31 to open or close so as to supply quench water to quench chamber 25 via lines 30 and nozzle 29. Consequently, the valve 31 may be automatically held at a standard setting, opened wider, or closed partially in response to signals produced by temperature sensing means 44 or 38 depending on which of them is indicating the higher temperature. Thus the flow of quench fluid into secondary quench chamber 25 is controlled in response to the preheated oil temperature or the second heat exchanger effluent temperature, depending on which of them is higher. Of course, normally the temperature of the effluent in contact with the sensing device 44 will be higher but where, because of some malfunction, it falls below that of the fuel oil to the reactor, then the sensing device 38 will control.

The effluent from which heat has been extracted by the process air and fuel oil in the preceeding stages, and quenched to the extent desirable, is next used to heat the process oil. The effluent thus passes through line 45 to the next preheat station 51. Preheat station 51 includes a heat exchanger having an outer shell 50 which receives effluent via line 48 and discharges it via line 56. Within shell 50 is contained process oil line 52. The process oil line 52 is in contact with hot effluent and the process oil entering the line 52 via connection 53 and exiting therefrom via line 7, operatively connected to line 52 by connection 54, is passed to the reactor.

In this embodiment the quantum of heat supplied to the process oil is controlled and regulated by means of a by-pass, though another quenching step could be used if desired. Thus, in the drawing is shown a by-pass line 57 connected to line 45 on its upstream side and to line 56 on its downstream side. A temperature sensing device 58 in line 7, is operatively connected through a control mechanism TRC–3 which opens and closes the by-pass line 57 in response to a signal from the temperature sensing device 58 which indicates the temperature of the process oil to the reactor. Thus, TRC–3 is connected to the temperature sensing device 58 via transmission line 61 and to motor means 59 via transmission line 60. Upon exceeding a preselected temperature the primary sensing device 58 transmits a signal to the motor valve 59 which reduces the flow of effluent through line 48 and increases the flow of effluent through by-pass 57 by manipulation of valve 46. When the temperature indicated by the sensing device 58 drops back to the preselected set point then, in similar manner, flow of effluent through by-pass 57 is reduced. It is apparent, as stated, that TRC–3 can also be used to operate a third quench system, as in the preceeding stages, rather than a by-pass should further quenching be desirable. It is also apparent that additional preheat stages can be provided for additional input materials or materials to other processes should this be desirable, and without departing from the operations herein described.

Also, as will be apparent a variety of commercially available sensing means, controllers and motor means are suitable for the purposes of the invention. The various available devices can differ from one another in that some rely on mechanical signalling, some on electrical signalling and others on hydraulic or pneumatic signalling. Thus the transmission lines referred to can take the form of air or hydraulic lines, electrical conductors, cables or any kind of mechanical linkage. It is evident that the exact type of temperature responsive control means selected is immaterial as long as it is able to operate the regulator valve in the manner described; as is obvious to those skilled in the art.

We claim:

1. In a carbon black process wherein input materials including process air, fuel and feedstock are continuously charged to a combustion zone and converted therein to a hot gaseous effluent containing carbon black in suspension and at least one of said input materials is preheated prior to its entry into the combustion zone by indirect heat exchange with the effluent, the improvement which comprises: maintaining the preheat temperature of said preheated input material at a relatively constant temperature by sensing the temperature of said preheated input material subsequent to preheating but prior to its entry into said combustion zone; and regulating the transfer of heat to said at least one input material in response to the sensed temperature of said preheated input material by varying the rate of flow of effluent to the heat exchange step in response to said sensed temperature.

2. Method according to claim 1 wherein said effluent is cooled with a quenching fluid prior to the heat exchange step and the transfer of heat is further regulated by varying the rate of flow of quench fluid in response to said sensed temperature.

3. Method according to claim 2 wherein there are: a first heat exchange step in which process air is heated to a first temperature; and a subsequent heat exchange step in which feedstock is preheated to a second and generally lower temperature than said process air.

4. Apparatus comprising: a carbon black reactor, having a combustion chamber and injection means for introducing input materials, including process air, fuel and feedstock into said combustion chamber; a heat exchanger in communication with said combustion zone, said exchanger having separate flow paths for gaseous effluent from said combustion zone and for an input material, said input material flow path being interposed in a conduit system connecting a source of said input material and the injection means therefor; temperature sensing means in said conduit system intermediate said exchanger and injection means for sensing the temperature of said input material subsequent to preheating and prior to injection into said combustion zone; and regulating means, connected with said temperature sensing means and responsive to said sensed temperature for regulating the transfer of heat from said effluent to said input material, said regulating means including means for by-passing a controlled portion of said effluent around the effluent flow path in said exchanger in response to the sensed temperature of the input material, whereby the flow of said input material into said combustion zone is maintained at a relatively constant temperature.

5. Apparatus according to claim 4 wherein the regulating means includes means for introducing a flow of quenching fluid into said effluent intermediate said combustion chamber and the effluent flow path in said heat exchanger, and means responsive to the sensed temperature of the input material for controlling the flow of quenching fluid.

6. Apparatus according to claim 9 wherein the regulating means includes a quench fluid injecting means in the effluent flow path upstream of at least one of the heat exchangers, motor valve means for varying the flow of quench fluid through said quench fluid injecting means, and ratio control means connected with the valve means and with the temperature sensing means associated with said at least one heat exchanger for controlling the valve in response to the temperature sensed by the last-mentioned temperature sensing means.

7. In a carbon black process wherein input materials including process air, fuel and feedstock are continuously charged to a combustion zone and converted therein to a hot gaseous effluent containing carbon black in suspension and a plurality of said input materials is preheated prior to their entry into the combustion zone, the improvement which comprises: preheating said plurality of input materials by sequential indirect heat exchange steps with said effluent; separately sensing the temperature of each of said preheated input materials subsequent to preheating but prior to its entry into said combustion zone; and separately regulating the transfer of heat to each of said input materials in response to the respective sensed temperatures of said preheated input materials, whereby the preheat temperatures of said preheated input materials are each maintained relatively constant.

8. Method according to claim 7, including generating a first signal representative of the temperature of the preheated input material from one of said sequential preheating steps; generating a second signal representative of the temperature of the gaseous effluent which departs said preheating step; and regulating the exchange of heat between said preheat material and gaseous effluent in said preheating step in response to the greater of said signals.

9. In a carbon black reactor, having a combustion chamber and injection means for introducing input materials, including process air, fuel and feedstock into said combustion chamber and heat exchanging means in communication with said combustion zone, the improvement which comprises: a plurality of sequentially connected indirect heat exchangers defining a flow path for gaseous effluent from said combustion zone, each of said exchangers also defining a separate flow path interposed in a conduit system interconnecting a source of supply of one of said input materials with the injection means therefor; separate temperature sensing means in each of said separate conduit systems intermediate said exchanger and injection means for separately measuring the temperatures of the respective input materials; and separate regulating means connected with and responsive to each of said temperature sensing means for separately regulating the transfer of heat from said effluent to each of said input materials in response to the respective sensed temperatures of the latter.

10. Apparatus in accordance with claim 9, including means for generating a first signal representative of the temperature of the preheated input material from one of said heat exchangers; means for generating a second signal representative of the temperature of the gaseous effluent from said heat exchanger; means for supplying only the greater of said first and second signals to the regulating means connected with said heat exchanger; and said regulating means being responsive to said greater signal for regulating the transfer of heat from said effluent to said input material in said heat exchanger.

References Cited by the Examiner

UNITED STATES PATENTS

| | | | |
|---|---|---|---|
| 2,781,246 | 2/1957 | Goldtrap | 23—209.4 |
| 2,844,443 | 7/1958 | King | 23—209.6 |
| 3,009,784 | 11/1961 | Krejci | 23—209.4 |
| 3,095,273 | 6/1963 | Austin | 23—209.6 |

OSCAR R. VERTIZ, *Primary Examiner.*

E. J. MEROS, *Assistant Examiner.*